US006230582B1

(12) United States Patent
Becker et al.

(10) Patent No.: US 6,230,582 B1
(45) Date of Patent: May 15, 2001

(54) CRANK FOR ADJUSTING AWNING ROLLER SPRING FORCE

(75) Inventors: Kent Becker, Huntertown; Robert D. Anderson; Robert L. Prior, both of LaGrange, all of IN (US)

(73) Assignee: White Consolidated Industries, Inc., Cleveland, OH (US)

( * ) Notice: Subject to any disclaimer, the term of this patent is extended or adjusted under 35 U.S.C. 154(b) by 0 days.

(21) Appl. No.: 09/150,719

(22) Filed: Sep. 10, 1998

(51) Int. Cl.[7] .......... F03G 1/08; E04H 15/06; E04F 10/06

(52) U.S. Cl. .......... 74/545; 160/22; 160/305; 160/315; 185/39

(58) Field of Search .......... 74/545, 548; 160/22, 160/66, 67, 68, 305, 309, 315, 191; 135/88.1, 88.12; 267/277; 185/10, 39, 45

(56) References Cited

U.S. PATENT DOCUMENTS

| | | | | |
|---|---|---|---|---|
| D. 94,073 | | 10/1934 | Chapman . | |
| D. 140,558 | | 3/1945 | Bartlett . | |
| D. 242,895 | | 1/1977 | Saureman . | |
| D. 270,424 | | 9/1983 | Weinerman . | |
| D. 275,446 | | 9/1984 | McSwain . | |
| 440,428 | * | 11/1890 | Griswold | 160/315 |
| 1,345,027 | | 6/1920 | Rippe . | |
| 1,396,663 | * | 11/1921 | Phinney | 74/548 |
| 1,398,263 | * | 11/1921 | Hale | 74/548 |
| 1,482,191 | | 1/1924 | Hornauer . | |
| 1,947,070 | * | 2/1934 | Traut | 160/315 |
| 2,190,005 | | 2/1940 | Basham . | |
| 2,464,941 | | 3/1949 | Rader . | |
| 2,750,185 | | 6/1956 | Moore . | |
| 2,971,619 | | 2/1961 | Koslo . | |
| 3,870,096 | * | 3/1975 | Horrell | 160/305 |
| 3,918,510 | * | 11/1975 | Hayward | 160/22 |
| 4,142,283 | | 3/1979 | Walker et al. . | |
| 4,302,043 | | 11/1981 | Dimmer et al. . | |
| 4,484,777 | | 11/1984 | Michel . | |
| 4,524,791 | * | 6/1985 | Greer | 160/305 |
| 5,031,682 | * | 7/1991 | Tedeschi | 160/315 |
| 5,101,684 | | 4/1992 | Mosslacher . | |
| 5,179,991 | | 1/1993 | Haddad, Jr. . | |
| 5,213,181 | | 5/1993 | ISaka . | |
| 5,394,769 | | 3/1995 | Cropley . | |
| 5,526,713 | | 6/1996 | Walter . | |
| 5,778,490 | * | 7/1998 | Curtis | 160/191 |

FOREIGN PATENT DOCUMENTS

| | | | |
|---|---|---|---|
| 1404 | * | 3/1897 | (GB) . |

* cited by examiner

*Primary Examiner*—David A. Bucci
*Assistant Examiner*—William C. Joyce
(74) *Attorney, Agent, or Firm*—Pearne & Gordon LLP

(57) ABSTRACT

An awning is attached to and wound on a spring loaded roller. The roller rotates on shafts secured to shaft mounts at each end. The shaft mount is secured on the end of a support arm. A crank has a two prong engagement member that fits in a slot of the shaft mount. The shaft mount is released from the support arm and the crank is turned to adjust spring force in the roller.

13 Claims, 3 Drawing Sheets

CRANK FOR ADJUSTING AWNING ROLLER SPRING FORCE

BACKGROUND OF THE INVENTION

This invention relates generally to the field of awnings and specifically to a system for adjusting force of a spring loaded awning roller.

Awnings for buildings and vehicles are often wound on a spring loaded roller. The spring maintains tension on the awning and facilitates retraction or deployment of the awning. As the spring ages, its force may decrease. In some cases, a change in the awning or its installation may result in the spring force being excessive or inadequate. It is, therefore, desirable to adjust the force of the spring.

BRIEF SUMMARY OF THE INVENTION

The present invention provides a roller crank system including a crank having an arm, a handle, and a first engagement member. A roller is rotatably mounted on a shaft. A shaft mount is connected for rotation with the shaft and has a second engagement member for receiving the first engagement member. The first engagement member is a pair of parallel prongs. The second engagement member is a slot. The handle, arm, and one of the prongs are formed from a single bar bent at two substantially right angles to define an S shape. A spacer is provided for spacing the second prong from and securing the second prong to the first prong.

A support arm supports the shaft and is releasably secured to the shaft mount. The support arm has a notch corresponding with the second engagement member. The shaft mount is partly nested in the support arm such that a part of the second engagement member is nested in the support arm. The support arm has an open notch corresponding with the second engagement member and permits release of the shaft support from the support arm when the first engagement member is engaged with the second engagement member. When the second engagement member is a slot, the notch permits passage of the first engagement member into the slot. The support arm is pivotably secured to a wall.

A spring urging rotation of the roller relative to the shaft. A lock selectively prevents rotation of the roller on the shaft. The lock prevents rotation of the roller in one direction while permitting rotation of the roller in another direction.

The invention also provides a method of adjusting spring force in a spring loaded roller mounted for rotation on a shaft, the shaft being engaged with a shaft mount having an engagement member and supported by a support arm. The method includes the steps of engaging a crank with the shaft mount engagement member; releasing the shaft mount from the support arm; turning the crank to adjust the force of the spring; replacing the shaft mount on the support arm; securing the shaft mount to the support arm; and disengaging the crank from the shaft mount. The invention also includes the step of setting a roller lock in a position permitting rotation of the shaft in a direction necessary to adjust the force of the spring prior to turning the crank.

DESCRIPTION OF THE INVENTION

Figure 1:
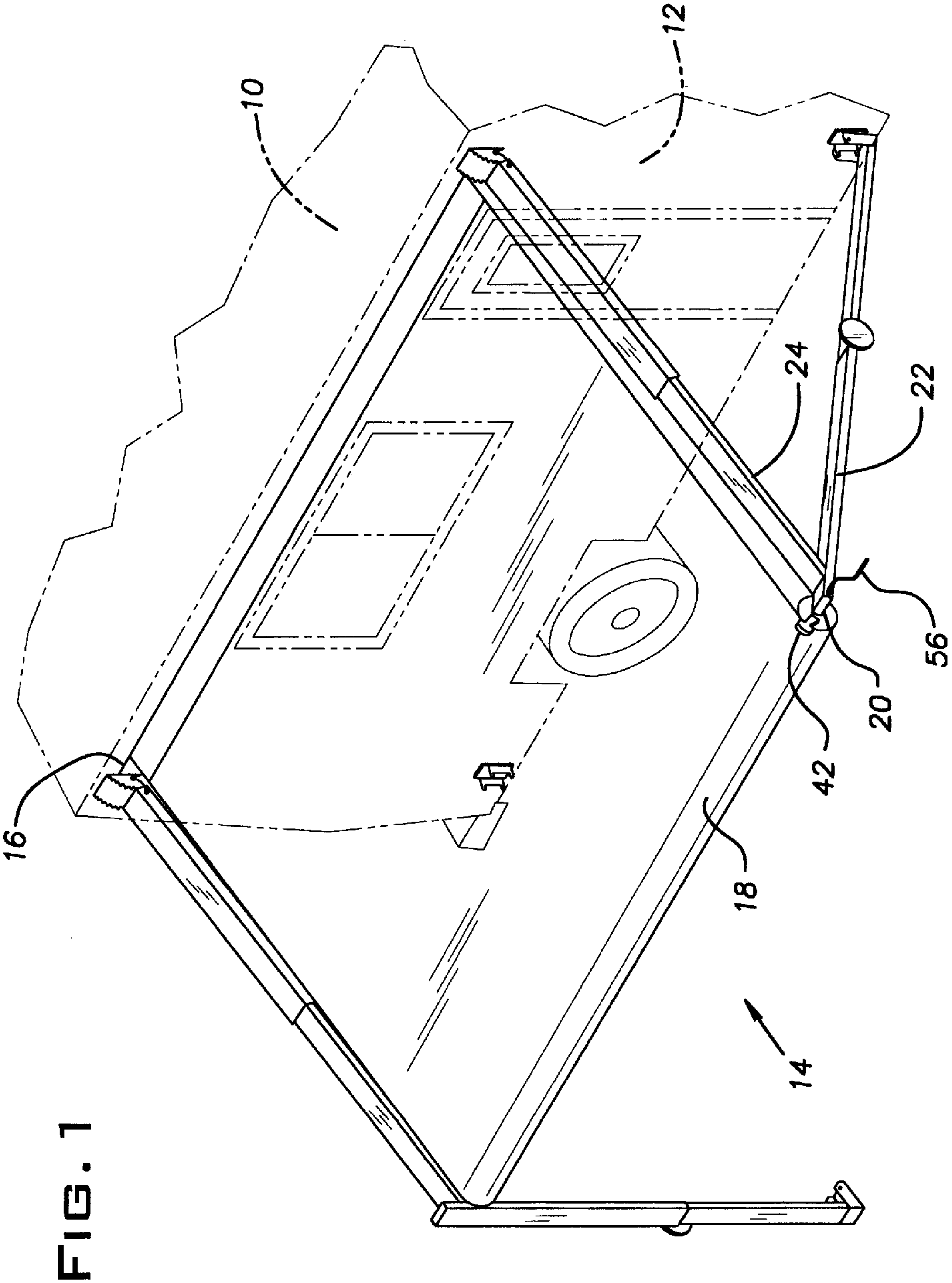
FIG. 1 shows a perspective view of an awning assembly according to the invention.

Referring to FIG. 1, a recreational vehicle 10 includes a side wall 12 having an awning assembly 14 mounted thereon. An awning rail 16 is fastened along an upper part of the wall 12. An edge of an awning canopy 18 is secured to the awning rail 16. An opposite edge of the awning 18 is secured to a roller 20. The roller is supported by a pair of support arms 22 removably mounted to the wall 12. Retractable rafters 24 maintain tension on the awning 18.

Figure 2:
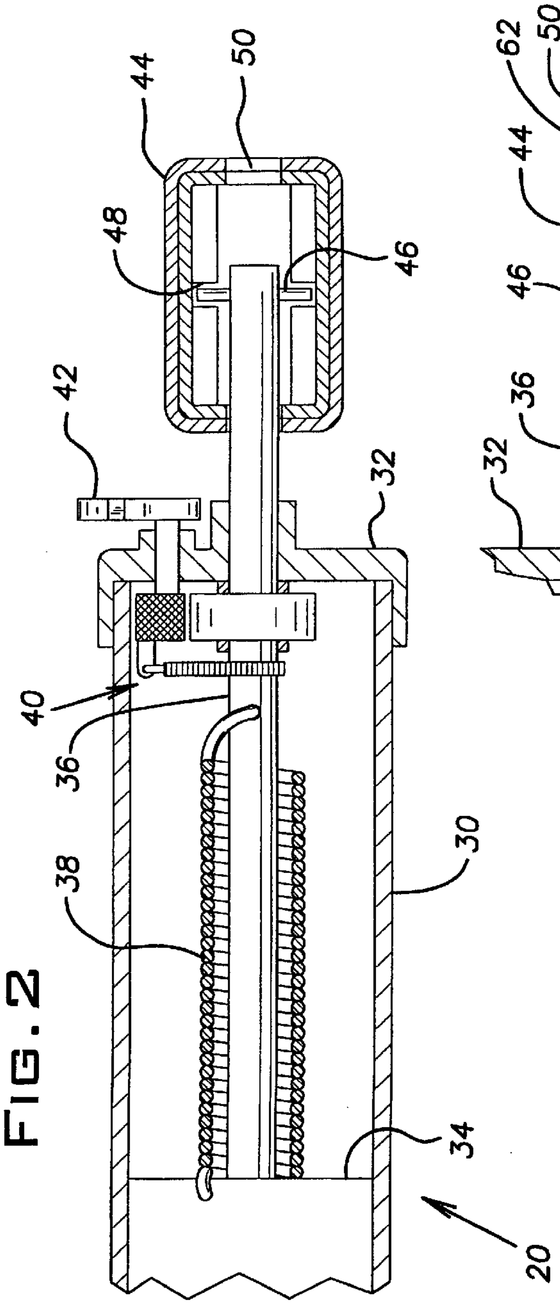
FIG. 2 shows a view of a roller and shaft mount in a section taken from line 2—2 of FIG. 4.

Referring to FIG. 2, the roller 20 includes a hollow tube 30 provided with an end cap 32 at each end and idler bearings 34 near each end. A roller shaft is defined by torsion rods 36 supported by the respective end caps 32 and idler bearings 34. A spring, such as a torsion spring 38 wound around each torsion rod 36, urges rotation of the roller 20 relative to the torsion rods 36. A roller lock 40 having an operating lever 42 is provided at one end of the roller 20. The lock 40 preferably includes one member mounted to the roller 20 and another member mounted to the shaft. In one locking position ("ROLL DOWN"), the lock 40 prevents rotation of the roller 20 in a first direction while permitting rotation in a second direction. In another locking position ("ROLL UP"), the lock 40 prevents rotation of the roller 20 in the second direction while permitting rotation in the first direction.

Figure 3:
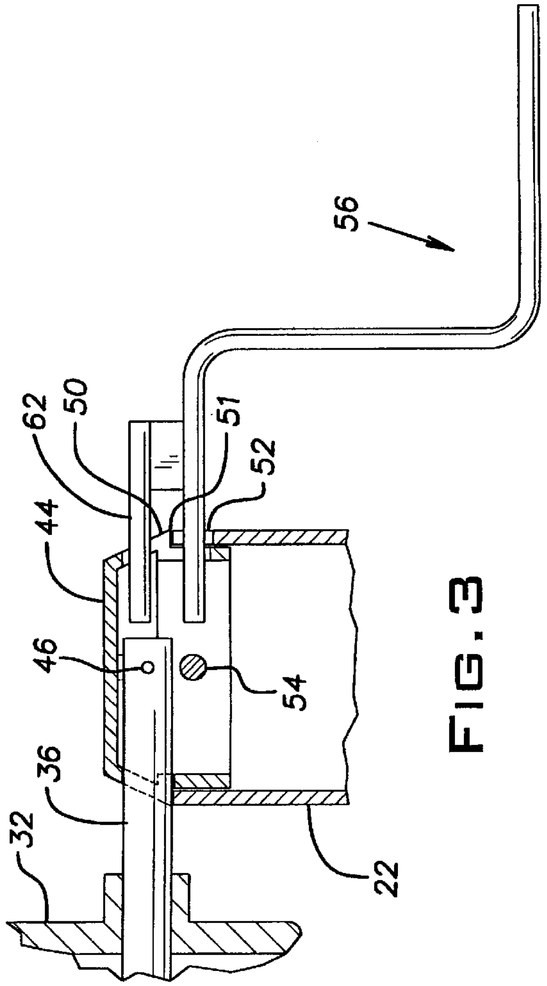
FIG. 3 shows a front view of the roller and shaft mount in a section taken from line 3—3 of FIG. 4.

Referring to FIGS. 2 and 3, the torsion rods 36 are supported on upper ends of the respective support arms 22. The rod 36 is retained on the support arm 22 by a shaft mount, such as a top casting 44. The rod 36 extends through a wall of the casting 44. A pin 46 through the torsion rod 36 is received in recesses 48 or holes in the top casting 44 to prevent rotation of the rod relative to the casting 44. An engagement member, such as a crank slot 50, is provided at a wall of the top casting 44 opposite the roller 20. Preferably, the slot 50 is closed. The top casting 44 is partly nested in the support arm 22 such that a shoulder 51 of the casting 44 rests on an upper edge of the support arm 22. A lower part of the slot 50 is disposed within the support arm 22. An notch 52 is provided in the support arm 22 that corresponds with the part of the slot 50 within the support arm 22. The top casting 44 is retained on the support arm 22 by a bolt 54.

Figure 4:
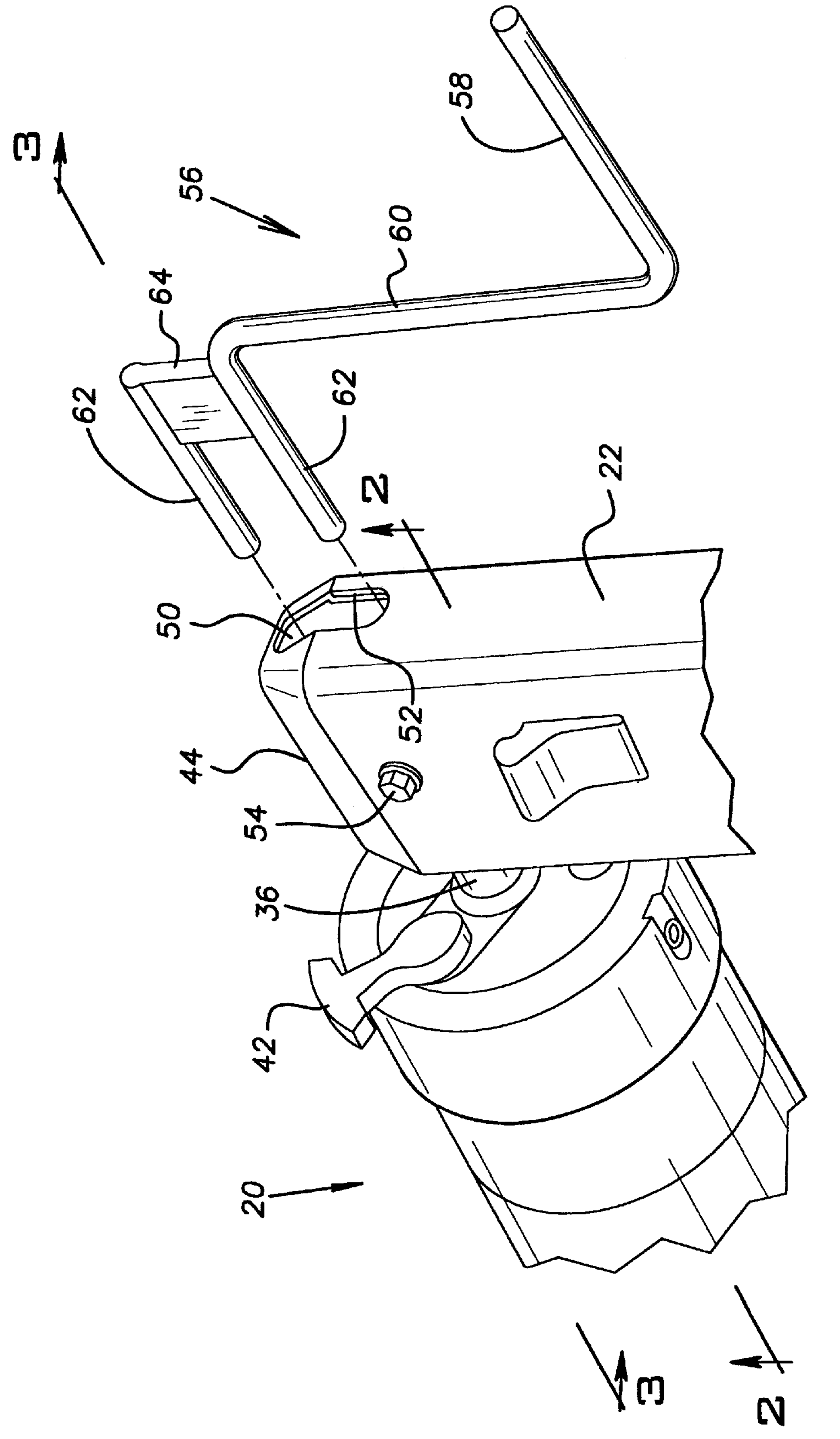
FIG. 4 shows an isometric view of an end of the roller and the shaft mount.

Referring to FIG. 4, a crank 56 includes a handle 58, an arm 60, an engagement member, such as a pair of prongs 62, and a spacer 64 between the prongs 62. Preferably, the handle, arm, and one of the prongs are formed from a single piece of bar stock having a circular or octagonal cross-section and bent at right angles to provide a distinctive appearance. The other prong is made of similar material. The spacer 64 is welded to the one prong and the other prong is welded to the spacer 64 so that the prongs 62 are parallel and spaced apart. Preferably, the crank 56 is formed from a 0.31 inch (0.79 cm) diameter steel rod having a length of about 14.0 inches (35.6 cm). The second prong is a 0.31 inch (0.79 cm) diameter steel rod having a length of about 4.0 inches (10.2 cm). The handle 58 is about 5.0 inches (12.7 cm) long and the arm 60 is about 5.0 inches (12.7 cm) long. The bends defining the handle, arm, and prong parts of the crank 56 have about a 0.62 inch (1.57 cm) bend radius. The spacer 64 is a 5/16 inch (0.79 cm) by ½ inch (1.27 cm) steel bar about 1.0 inch (2.5 cm) long. The spacer 64 is welded between the prongs 62 so that the prongs 62 project about 2.0 (5.1 cm) inches from the spacer 64.

In operation, the prongs 62 are inserted in the slot 50. Typically, the roller lock 40 is provided at only one end of the roller 20. If the spring 38 at the locked end is being adjusted, the lock 40 must be in the proper position. To increase the force of the spring 38, the lever 42 is placed in the "ROLL DOWN" position. To reduce the force of the spring 38, the lever 42 is place in the "ROLL UP" position.

The bolt 54 is removed from the support arm 22 to release the top casting 44, which is then removed from the support arm 22. The crank 56, and therefore the casting 44 and rod 36, are rotated until the spring 38 has the desired force. The 56 crank transmits a torsional force that alters the tension or compression of the spring 38. Indicia, such as arrows, can be provided to indicate the direction of rotation for adding or removing force. The casting 44 is replaced on the support arm 22.

The present disclosure describes several embodiments of the invention, however, the invention is not limited to these embodiments. Other variations are contemplated to be within the spirit and scope of the invention and appended claims.

What is claimed is:

1. A roller crank system comprising:

a crank having an arm, a handle, and a first engagement member, wherein the first engagement member is a pair of parallel prongs;

a shaft;

a roller rotatably mounted on the shaft for rotation relative to the shaft; and a shaft mount connected for rotation with the shaft and having a second engagement member for receiving the first engagement member.

2. The crank system according to claim 1, wherein the second engagement member is a slot.

3. The crank system according to claim 1, wherein the handle, arm, and one of the prongs comprise a single bar bent at two substantially right angles to define an S shape.

4. The crank system according to claim 3, further comprising a spacer for spacing the second prong from and securing the second prong to the first prong.

5. The crank system according to claim 1, further comprising a spring urging rotation of the roller relative to the shaft.

6. The crank system according to claim 5, further comprising a lock for selectively preventing rotation of the roller on the shaft.

7. The crank system according to claim 6, wherein the lock prevents rotation of the roller in one direction while permitting rotation of the roller in another direction.

8. A roller crank system comprising:

a crank having an arm, a handle, and a first engagement member;

a shaft;

a roller rotatably mounted on the shaft; and a shaft mount connected for rotation with the shaft and having a second engagement member for receiving the first engagement member;

a support arm supporting and releasably secured to the shaft mount, wherein the support arm has a notch corresponding with the second engagement member.

9. The crank system according to claim 8, wherein the shaft mount is partly nested in the support arm such that a part of the second engagement member is nested in the support arm, the support arm having an open notch corresponding with the second engagement member and permitting release of the shaft support from the support arm when the first engagement member is engaged with the second engagement member.

10. The crank system according to claim 9, wherein the second engagement member is a slot and the notch permits passage of the first engagement member into the slot.

11. A crank system comprising:

a crank having an arm, a handle, and a first prong defined by a bent bar; a spacer secured to the first prong; and a bar defining a second prong secured to the spacer to define a pair of parallel prongs;

a shaft;

a roller rotatably mounted on the shaft;

a spring urging rotation of the roller relative to the shaft;

a lock for selectively preventing rotation of the roller on the shaft in one direction while permitting rotation in another direction;

a shaft mount having the shaft projecting through a first wall of the shaft mount and having a closed slot for receiving the parallel prongs of the crank, the slot being defined in a second wall of the shaft mount opposite the first wall so that the prongs are substantially parallel with the shaft when disposed in the slot;

a pin through the shaft and engaging the shaft mount to prevent rotation of the shaft relative to the shaft mount;

a support arm to which the shaft mount is releasably secured such that the shaft mount is partly nested in the support arm such that a part of the slot is nested in the support arm, the support arm having an open notch corresponding with the slot and permitting passage of the prongs into the slot and release of the shaft mount from the support arm when the prongs are disposed in the slot and the support arm being pivotably mounted to a wall.

12. A roller crank system comprising:

a crank having an arm, a handle, and a first engagement member;

a shaft;

a roller rotatably mounted on the shaft for rotation realative to the shaft; and a shaft mount connected for rotation with the shaft and having a second engagement member for receiving the first engagement member;

a support arm supporting and releasably secured to the shaft mount, wherein the support arm is pivotably secured to a wall.

13. A method of adjusting a spring loaded roller mounted for rotation on a shaft, the shaft being engaged with a shaft mount having an engagement member and supported by a support arm, the method comprising the steps of:

engaging a crank with the shaft mount engagement member;

removing the shaft mount from the support arm;

setting a roller lock in a position permitting rotation of the shaft in a direction necessary to adjust the force of the spring turning the crank to adjust the force of the spring;

replacing the shaft mount on the support arm;

securing the shaft mount to the support arm; and disengaging the crank from the shaft mount.

* * * * *